United States Patent
Bitar et al.

(10) Patent No.: US 9,612,941 B1
(45) Date of Patent: Apr. 4, 2017

(54) LIVE DATA FABRICATION

(71) Applicant: International Business Machines Corporation, Armonk, NY (US)

(72) Inventors: Akram Bitar, Kfar Peqiin (IL); Oleg Blinder, Haifa (IL); Ronen Levy, Haifa (IL); Tamer Salman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/881,170

(22) Filed: Oct. 13, 2015

(51) Int. Cl.
*G06F 11/00* (2006.01)
*G06F 11/36* (2006.01)

(52) U.S. Cl.
CPC ...... *G06F 11/3664* (2013.01); *G06F 11/3688* (2013.01)

(58) Field of Classification Search
USPC .......................................................... 714/38
See application file for complete search history.

(56) References Cited

U.S. PATENT DOCUMENTS

| | | | |
|---|---|---|---|
| 6,931,572 B1 * | 8/2005 | Schubert | G01R 31/31704 714/30 |
| 2008/0222246 A1 | 9/2008 | Ebling et al. | |
| 2011/0184575 A1 * | 7/2011 | Kawamoto | G06Q 50/06 700/292 |
| 2012/0159518 A1 | 6/2012 | Boliek et al. | |
| 2013/0318400 A1 * | 11/2013 | Liang | G06F 11/006 714/32 |

* cited by examiner

*Primary Examiner* — Sarai Butler
(74) *Attorney, Agent, or Firm* — Daniel Kligler

(57) ABSTRACT

Methods, computing systems and computer program products implement embodiments of the present invention that include defining multiple data fabrication rules, each of the data fabrication rules including a fabrication time and a data operation. a simulation of a software application is initiated, the simulation including a sequence of simulation times, and upon detecting, during the simulation, one or more first given fabrication rules having respective fabrication times matching one or more first simulation times, fabricated data is generated in response to performing the respective data operation of each of the detected one or more first given fabrication rules. Upon detecting, during the simulation, a second given fabrication rule whose fabrication time matches a second simulation time subsequent to the one or more first simulation times, the data operation of the second given fabrication rule is performed on a subset of the fabricated data.

20 Claims, 3 Drawing Sheets

LIVE DATA FABRICATION

FIELD OF THE INVENTION

The present invention relates generally to software testing, and specifically to fabricating dynamic data for testing a software system.

BACKGROUND

Computer systems can use rules for fabricating test data. The rules describe requirements the fabricated data should satisfy. These rules can be defined by a testing engineer or gained automatically from the involved environments. Rules used for fabricating test typically originate sources such as (a) Data-logic (e.g., referential integrity), (b) Application-logic (e.g., relations between different attributes dictated by the application), and (c) Test-logic (e.g., rules dictated by the test person to produce data that exercises specific test scenario).

The description above is presented as a general overview of related art in this field and should not be construed as an admission that any of the information it contains constitutes prior art against the present patent application.

SUMMARY

There is provided, in accordance with an embodiment of the present invention a method, including defining multiple data fabrication rules, each of the data fabrication rules including a fabrication time and a data operation, initiating a simulation of a software application, the simulation including a sequence of simulation times, upon detecting, during the simulation, one or more first given fabrication rules having respective fabrication times matching one or more first simulation times, generating fabricated data in response to performing the respective data operation of each of the detected one or more first given fabrication rules, and upon detecting, during the simulation, a second given fabrication rule whose fabrication time matches a second simulation time subsequent to the one or more first simulation times, performing the data operation of the second given fabrication rule on a subset of the fabricated data.

There is also provided, in accordance with an embodiment of the present invention an apparatus, including a memory, and a processor configured to define, in the memory, multiple data fabrication rules, each of the data fabrication rules including a fabrication time and a data operation, to initiate a simulation of a software application, the simulation including a sequence of simulation times, upon detecting, during the simulation, one or more first given fabrication rules having respective fabrication times matching one or more first simulation times, to generate fabricated data in response to performing the respective data operation of each of the detected one or more first given fabrication rules, and upon detecting, during the simulation, a second given fabrication rule whose fabrication time matches a second simulation time subsequent to the one or more first simulation times, to perform the data operation of the second given fabricated rule on a subset of the data.

There is further provided, in accordance with an embodiment of the present invention a computer program product, the computer program product including a non-transitory computer readable storage medium having computer readable program code embodied therewith, the computer readable program code including computer readable program code configured to initiate a simulation of a software application, the simulation including a sequence of simulation times, computer readable program code configured, upon detecting, during the simulation, one or more first given fabrication rules having respective fabrication times matching one or more first simulation times, to generate fabricated data in response to performing the respective data operation of each of the detected one or more first given fabrication rules, and computer readable program code configured, upon detecting, during the simulation, a second given fabrication rule whose fabrication time matches a second simulation time subsequent to the one or more first simulation times, to perform the data operation of the second given fabrication rule on a subset of the data.

BRIEF DESCRIPTION OF THE DRAWINGS

The disclosure is herein described, by way of example only, with reference to the accompanying drawings, wherein.

DETAILED DESCRIPTION OF EMBODIMENTS

Embodiments of the present invention provide methods and systems for fabricating live test data for a software application, in which the fabrication process is modeled using sets of requirements (also referred to herein as rules) associated with different points in time, ranges of times, or external events. In embodiments where multiple sets of test data are fabricated for a software application comprising a database, each of the sets can provide to insert, update, or delete data to/from the database.

As explained hereinbelow, multiple data fabrication rules are defined, each of the data fabrication rules comprising a fabrication time and a respective data operation. Once the fabrication rules are defined, a simulation of a software application is initiated, the simulation comprising a sequence of simulation times. For example, the software application may comprise a database application, and the sequence of simulation times may comprise hourly times (e.g., 14:00, 13:00, 15:00 etc.) over a duration of one week.

During the simulation, upon detecting one or more first given rules having respective fabrication times matching one or more first simulation times, fabricated data can be generated in response to performing the respective data operation of each of the detected one or more first given rules, and upon detecting a second given rule whose fabrication time matches a second simulation time subsequent to the one or more first simulation times, the data operation of the second given fabrication rule can be performed on a subset of the fabricated data.

In embodiments where the software application comprises a database, upon analyzing the modeled requirements, the live data fabrication process can then be activated where data is generated and inserted, updated, or deleted at the requested points in time. As a result, an observer of the database can react with it as if reacting with a live production database that typically changes over time. In embodiments of the present invention, time can be either real time or simulated time.

SYSTEM DESCRIPTION

Figure 1:
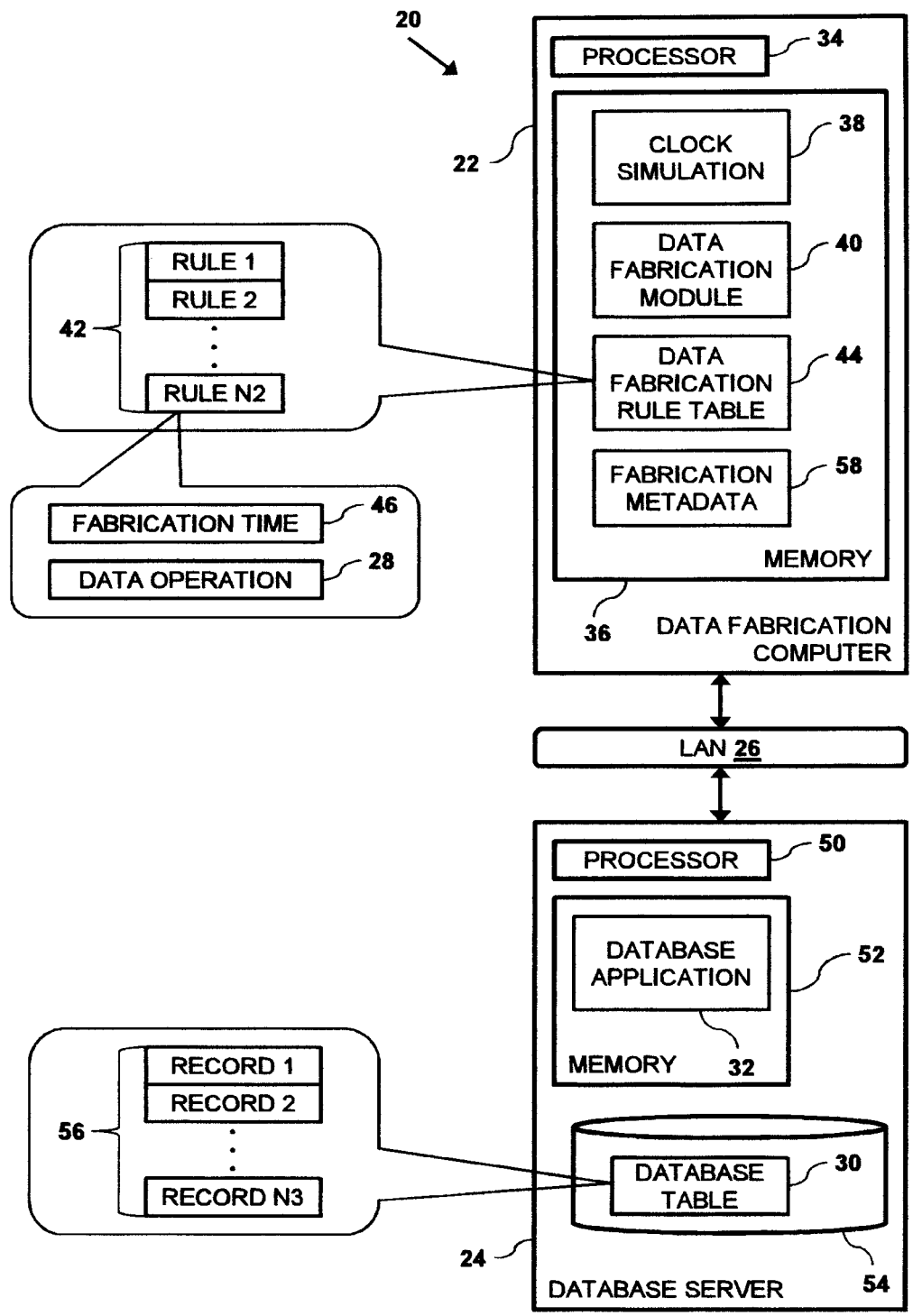
FIG. 1 is a block diagram that schematically illustrates a computing facility comprising a computer system configured to fabricate live test data, in accordance with an embodiment of the present invention.

FIG. 1 is a block diagram that schematically illustrates a facility 20 comprising a data fabrication computer 22 (also referred to herein as computer 22) and a database server 24 that communicate via a local area network (LAN) 26, in accordance with an embodiment of the invention. While the configuration in FIG. 1 shows computer 22 fabricating test data comprising data operations 28 on a database table 30 managed by a database application 32, the data fabrication computer fabricating any other type of test data for any other type of software application is considered to be within the spirit and scope of the present invention.

Additionally, while the configuration in FIG. 1 shows fabrication computer 22 and database server 24 communicating over LAN 26, the fabrication computer and database server being directly connected to each other or communicating over any other type of network (e.g., a wide area or wireless network) is considered to be within the spirit and scope of the present invention. Furthermore, while embodiments herein describe computer 22 fabricating data for database server 24, having a single computer that both fabricates and processes the data is considered to be within the spirit and scope of the present invention.

Computer 22 comprises a fabrication processor 34 and a fabrication memory 36. In the configuration shown in FIG. 1, processor 34 executes, from memory 36, a clock simulation module and a data fabrication module 40. In operation, clock simulation module simulates generating a sequence of dates and times, and data fabrication module 40 performs data operations 28 based on the simulated times and fabrication rules 42 (also referred to herein as rules 42) in a data fabrication rule table stored in memory 36. Memory 36 also stores fabrication metadata 58, whose functionality is described hereinbelow.

Each rule 42 comprises a fabrication time 46 and a given data operation 28. For a given rule 42 having a respective fabrication time 46 and a respective data operation 46, the respective data operation comprises instructions to perform a given data operation 28, and the respective fabrication time indicates when fabrication module 40 is to perform the respective data operation.

Database server 24 comprises a database processor 50, a database memory 52 and a storage device 54. In operation, processor 50 executes, from memory 52, database application 32 in order to manage database table 30 comprising multiple records 56 stored on storage device 54. While the example in FIG. 1 shows a single database table 30, creating and managing test data for multiple database tables 30 is considered to be within the spirit and scope of the present invention.

In some embodiments, database server may have a database clock module (not shown) that can be synchronized with clock simulation module 38 during the test data fabrication process. The database clock module can implemented in either hardware or software.

Processors 34 and 50 typically comprise a general-purpose computer, which are programmed in software to carry out the functions described herein. The software may be downloaded to computer 22 and database server 24 in electronic form, over a network, for example, or it may be provided on non-transitory tangible media, such as optical, magnetic or electronic memory media. Alternatively, some or all of the functions of processors 34 and 50 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

LIVE TEST DATA FABRICATION

Figure 2:
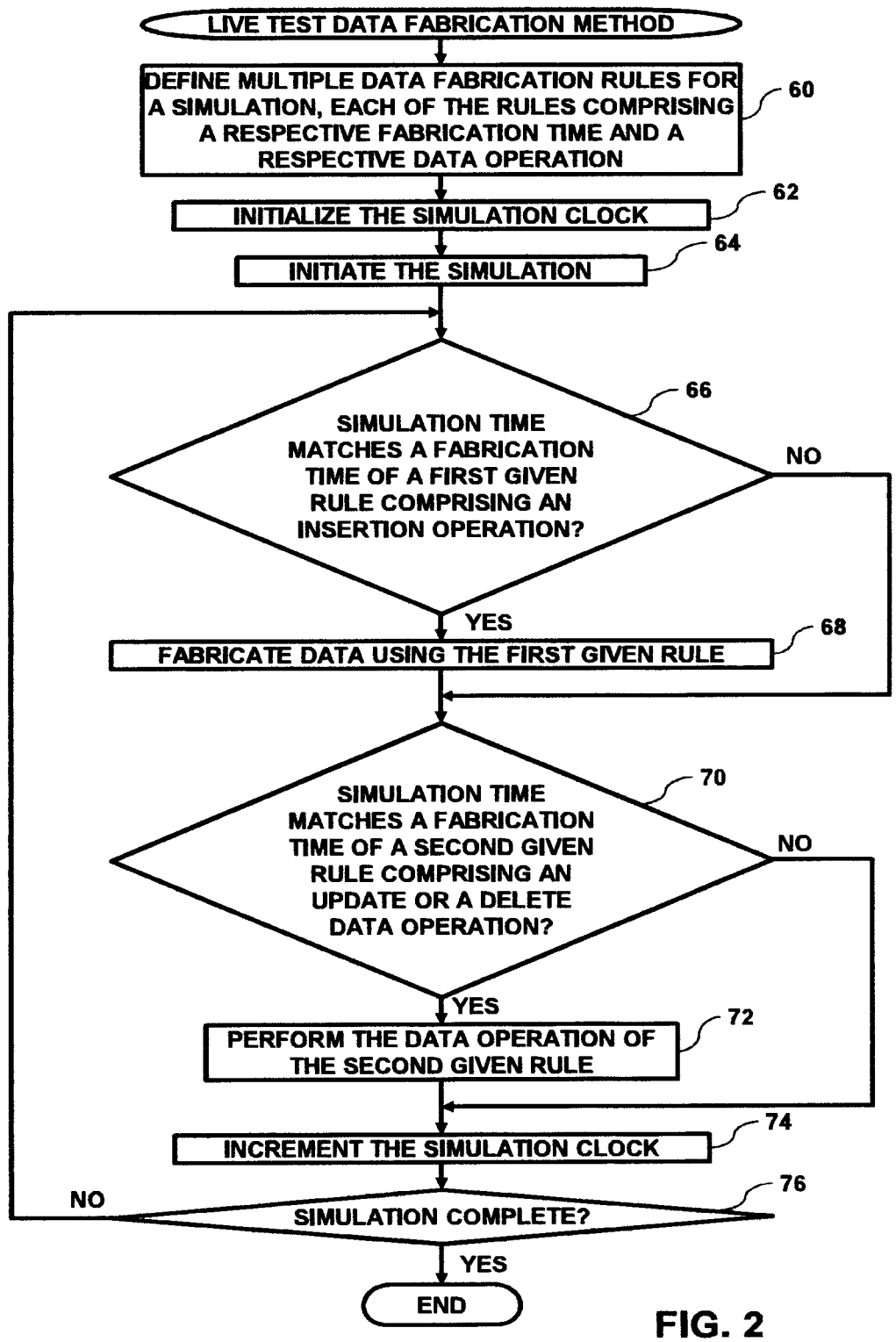
FIG. 2 is a flow diagram that schematically illustrates a method of fabricating live test data, in accordance with an embodiment of the present invention.

FIG. 2 is a flow diagram that schematically illustrates a method for fabricating test data comprising multiple data operations 28, in accordance with an embodiment of the present invention. In a definition step 60, processor 34 defines multiple data fabrication rules 42, each of the data fabrication rules comprising a respective fabrication time 46 and a respective data operation 28. In some embodiments, processor 34 can define rules 42 by retrieving them from a file (not shown). In alternative embodiments, processor 34 can define rules 42 based on input received from a user (not shown).

Each fabrication time 46 can be either a specific time or a time range. For example, a first given rule 42 may comprise a first given data operation 28 that adds a first number (e.g., 100) records 48 to database table 30 at a specific time (e.g., 12:00) indicated by the respective fabrication time 46, and a second given rule 42 may comprise a second given data operation 28 that adds a second number (e.g., 500) records 48 to database table 30 in a time range (e.g., between a starting time of 13:00 and an ending time of 15:00) indicated by the respective fabrication time 46.

In an initialization step 62, processor 34 initializes clock simulation module 38 to start incrementing the date and time for facility 20, and in a start step 64, the fabrication processor starts the simulation that will use test data fabrication module 40 to fabricate the test data for database table 30. Once clock simulation module 38 is initialized, the clock simulation module can report a "current time" (i.e., for the simulation) to processor 34.

As described supra, in embodiments where data fabrication module generates fabricated data for database table 30, data operations 28 comprise insertion operations, update operations, and delete operations. Inserting, updating and deleting records 56 is described in detail hereinbelow.

In a first comparison step 66, if the current simulation time matches the respective fabrication time 46 of a first given rule 42 whose respective data operation 28 comprises an insertion operation (i.e., adding one or more records 56), then in a fabrication step 68, data fabrication module 40 generates fabricated data (i.e., one or more records 48). Using the first given rule. In a second comparison step 70, if the current simulation time matches the respective fabrication time 46 of a second given rule 42 whose respective data operation 28 comprises an update operation or a deletion operation (i.e., updating or deleting one or more records 56), then in a data operation step 72, data fabrication module 40 performs the respective update or deletion operation.

In an increment step 74, clock simulation module 38 increments the simulation time. In some embodiments, data simulation module 40 can specify the increment value (e.g., 30 seconds, one minute, five minutes, one day etc.).

In a third comparison step 76, if the simulation is complete, then the method ends. However, if the simulation is not complete, then the method continues with step 66. Returning to step 70, if the current simulation time does not match the respective fabrication time 46 of a second given rule 42 whose respective data operation 28 comprises an update operation or a deletion operation, then the method continues with step 74. Returning to step 66, if the current simulation time does not match the respective fabrication time 46 of a first given rule whose respective data operation 28 comprises an insertion operation, then the method continues with step 70.

Figure 3:
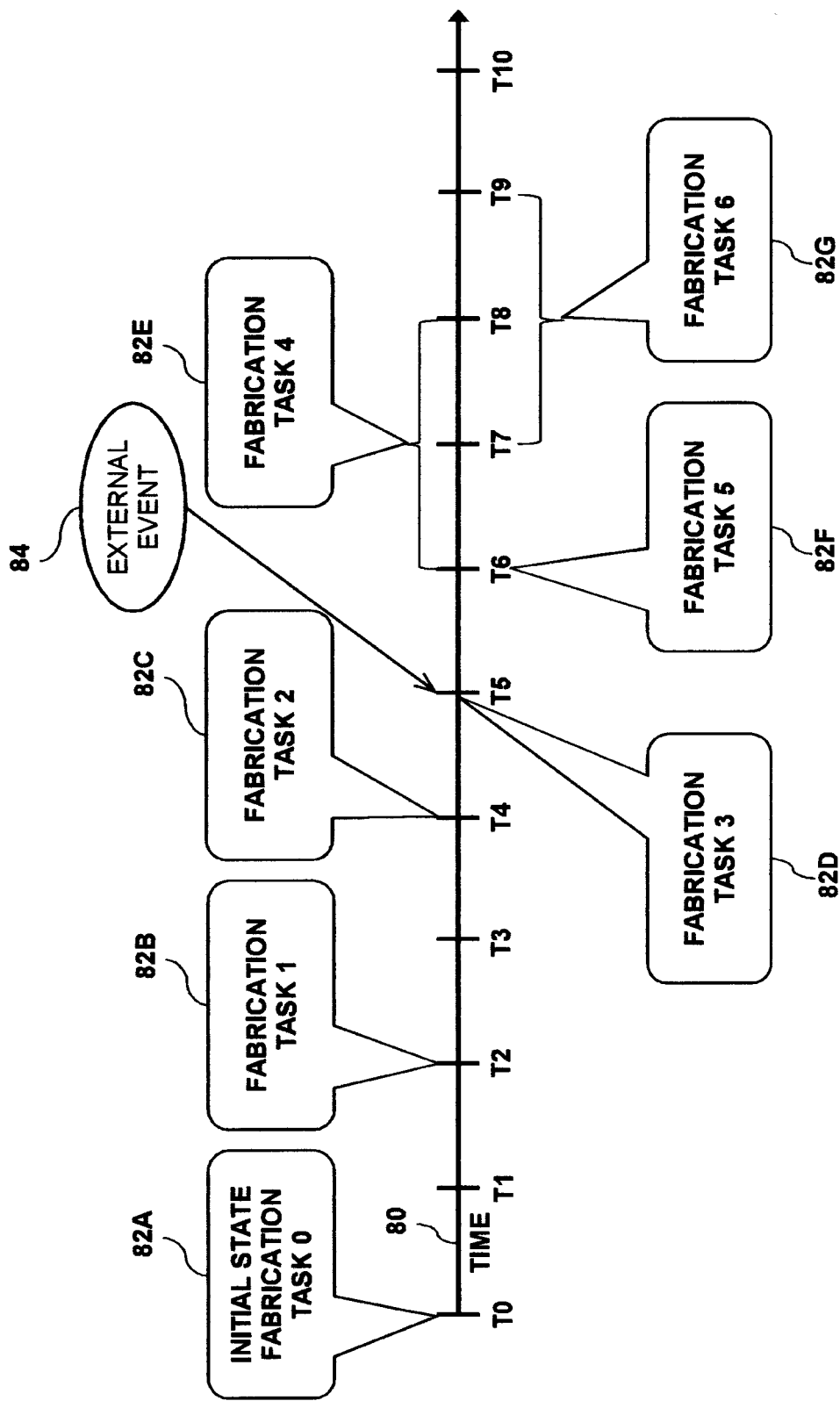
FIG. 3 is block diagram that schematically illustrates a timeline comprising multiple test data fabrication tasks, in accordance with an embodiment of the present invention.

FIG. 3 is block diagram that schematically illustrates a timeline 80 comprising multiple test data fabrication tasks 82 that data fabrication module performs using data operations 28, in accordance with an embodiment of the present invention. In FIG. 3, tasks 82 are differentiated by appending a letter to the identifying numeral, so that the data fabrication tasks comprise tasks 82A-82G.

Fabrication tasks 82 can be associated either with specific points in time on timeline 80 or with a range in times on the timeline, or asynchronously with an external event 84 triggered by an interface exposed by the implementation. For example, processor 34 may run an additional software module that simulates price changes of a set of stocks (i.e., tradeable equity securities) over a time period, and a given rule 42 may purchasing a given stock upon detecting a first given price and/or selling the given stock at a second given price.

In the timeline shown in FIG. 3, fabrication task 82A is associated with point in time T0, fabrication task 82B is associated with point in time T2, fabrication task 82C is associated with point in time T4, fabrication task 82D is associated with point in time T5, fabrication task 82E is associated with time range [T6, T8], fabrication task 82F is associated with point in time T6, and fabrication task 82G is associated with time range [T7, T9]. As shown on the timeline, embodiments of the present invention allow data fabrication module 40 to run multiple fabrication tasks concurrently (as shown with tasks 82E and 82F), and for a first given task 84 to overlap a second given task 84 (as shown with tasks 82E and 82G).

In some embodiments, the concept of time (i.e., T0, T1 etc.) can be either simulated or real time. In simulated time, data fabrication module 40 can implement an ordered sequence of actions without any time constraints.

In additional embodiments, data fabrication module 40 may perform some of the data fabrication offline. For example, if the simulated time is accelerated, the accelerated timeframe may not provide enough time for data fabrication module 40 to fabricate data during the "simulated time". In these situations, data fabrication module 40 can perform any necessary fabrication tasks in an offline mode, data (insert, update, or delete commands) can be prepared before starting the live mode, and the prepared tasks can then be applied during the simulated time.

As described supra, in embodiments where module 40 fabricates test data for a software application comprising database application 32, each given data operation 46 comprises either an update operation, a deletion operation, or an insertion operation. When performing an insertion task, data fabrication module 40 can use the following information:

A number of records 56 to fabricate and their target tables 30.

A set of rules 42 to satisfy.

A set of pointers to fabricated rows for reference by other tasks. As described supra, the set of pointers can be stored to fabrication metadata 58.

If associated with a time range, then a unit operation size should be specified.

When performing an update using a first update operation embodiment, a given rule 42 may identify a given table 30, and specify (a) Where clauses to identify the records to be updated, (b) A set of columns to be updated, and (c) A set of rules that should be satisfied in the updated values. In a second update operation embodiment, a given rule 42 may reference fabricated records 48 from previous insert/update operations 46 and specify (a) A set of columns to be updated, and (b) A set of conditions that should be satisfied in the updated values.

When fabricating records 56, data fabrication module 40 may store, to fabrication metadata 58, information describing (e.g., pointers referencing) the fabricated records. Storing this information to metadata enables subsequent data operations to quickly identify a subset of records 56 to be updated or deleted.

Deletion operations can be performed in two different ways. In a first deletion embodiment, a given rule 42 can specify a set of tables 30 and one or more "where" clauses that identify any records 56 to be deleted. In a second deletion embodiment, a given rule 42 can reference (e.g. via metadata 58) one or more rows 56 that were previously fabricated by module 40. In operation, the first and the second deletion embodiments may be combined. Additionally, if a given deletion operation is associated with a time range, then the rule can specify a unit operation size.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
defining multiple data fabrication rules, each of the data fabrication rules comprising a fabrication time and a data operation;
initiating a simulation of a software application, the simulation comprising a sequence of simulation times;
upon detecting, during the simulation, one or more first given fabrication rules having respective fabrication times matching one or more first simulation times, generating fabricated data in response to performing the respective data operation of each of the detected one or more first given fabrication rules; and
upon detecting, during the simulation, a second given fabrication rule whose fabrication time matches a second simulation time subsequent to the one or more first simulation times, performing the data operation of the second given fabrication rule on a subset of the fabricated data.

2. The method according to claim 1, wherein detecting a given fabrication time matching a given simulation time comprises detecting that the given fabrication time is within a simulation time range having a starting simulation time and an ending simulation time.

3. The method according to claim 1, wherein the software application comprises a database application, and wherein the data comprises a database table.

4. The method according to claim 3, wherein fabricating the data comprises inserting one or more records into the database table.

5. The method according to claim 4, wherein the records comprise first records, and wherein performing an operation on the subset of the data is selected from a group of operations consisting of inserting one or more second records into the database, updating one or more of the first records and deleting one or more or of the first records.

6. The method according to claim 5, wherein fabricating the data comprises storing, to a memory, metadata describing the one or more first records, and wherein updating the subset of the data comprises identifying the subset of the data in the metadata.

7. The method according to claim 1, wherein a given rule comprises detecting an external event, and wherein the step of generating the fabricated data is performed upon detecting the external event.

8. An apparatus, comprising:
a memory; and
a processor configured:
to define, in the memory, multiple data fabrication rules, each of the data fabrication rules comprising a fabrication time and a data operation,
to initiate a simulation of a software application, the simulation comprising a sequence of simulation times,
upon detecting, during the simulation, one or more first given fabrication rules having respective fabrication times matching one or more first simulation times, to generate fabricated data in response to performing the respective data operation of each of the detected one or more first given fabrication rules, and
upon detecting, during the simulation, a second given fabrication rule whose fabrication time matches a second simulation time subsequent to the one or more first simulation times, to perform the data operation of the second given fabricated rule on a subset of the data.

9. The apparatus according to claim 8, wherein the processor is configured to detect a given fabrication time matching a given simulation time by detecting that the given fabrication time is within a simulation time range having a starting simulation time and an ending simulation time.

10. The apparatus according to claim 8, wherein the software application comprises a database application, and wherein the data comprises a database table.

11. The apparatus according to claim 10, wherein the processor is configured to fabricate the data by inserting one or more records into the database table.

12. The apparatus according to claim 11, wherein the records comprise first records, and wherein the data operation performed on the subset of the data is selected from a group of operations consisting of inserting one or more second records into the database, updating one or more of the first records and deleting one or more or of the first records.

13. The apparatus according to claim 12, wherein the processor is configured to fabricate the data by storing, to a memory, metadata describing the one or more first records, and wherein the processor is configured to update the subset of the data by identifying the subset of the data in the metadata.

14. The apparatus according to claim 8, wherein a given rule comprises detecting an external event, and wherein the processor is configured to generate the fabricated data upon detecting the external event.

15. A computer program product, the computer program product comprising:
a non-transitory computer readable storage medium having computer readable program code embodied therewith, the computer readable program code comprising:
computer readable program code configured to define multiple data fabrication rules, each of the data fabrication rules comprising a fabrication time and a data operation;
computer readable program code configured to initiate a simulation of a software application, the simulation comprising a sequence of simulation times;
computer readable program code configured, upon detecting, during the simulation, one or more first given fabrication rules having respective fabrication times matching one or more first simulation times, to generate fabricated data in response to performing the respective data operation of each of the detected one or more first given fabrication rules; and
computer readable program code configured, upon detecting, during the simulation, a second given fabrication rule whose fabrication time matches a second simulation time subsequent to the one or more first simulation times, to perform the data operation of the second given fabrication rule on a subset of the data.

16. The computer program product according to claim 15, wherein the computer readable program code is configured to detect a given fabrication time matching a given simulation time by detecting that the given fabrication time is within a simulation time range having a starting simulation time and an ending simulation time.

17. The computer program product according to claim 15, wherein the software application comprises a database application, and wherein the data comprises a database table, and wherein the computer readable program code is configured to fabricate the data by inserting one or more records into the database table.

18. The computer program product according to claim 17, wherein the records comprise first records, and wherein the data operation performed on the subset of the data is selected from a group of operations consisting of inserting one or more second records into the database, updating one or more of the first records and deleting one or more or of the first records.

19. The computer program product according to claim 18, wherein the computer readable program code is configured to fabricate the data by storing, to a memory, metadata describing the one or more first records, and wherein the computer readable program code is configured to update the subset of the data by identifying the subset of the data in the metadata.

20. The computer program product according to claim 15, wherein a given rule comprises detecting an external event, and wherein the computer readable program code is configured to generate the fabricated data upon detecting the external event.

* * * * *